United States Patent [19]

Saskiki et al.

[11] Patent Number: 4,552,237

[45] Date of Patent: Nov. 12, 1985

[54] COMBINATORIAL WEIGHING METHOD AND APPARATUS

[75] Inventors: Takashi Saskiki, Nagaokakyo; Keiko Sakaeda, Kyoto, both of Japan

[73] Assignee: Kabushiki Kaisha Ishida Koki Seisakusho, Kyoto, Japan

[21] Appl. No.: 505,479

[22] Filed: Jun. 17, 1983

[30] Foreign Application Priority Data

Jun. 23, 1982 [JP] Japan .................................. 57-107789

[51] Int. Cl.⁴ ........................................... G01G 19/22
[52] U.S. Cl. ........................................... 177/25; 177/1
[58] Field of Search ................................. 177/1, 25, 50

[56] References Cited

U.S. PATENT DOCUMENTS 4,137,976  2/1979  Grayson, Jr. ..................... 177/25 X
4,418,772  12/1983  Fukuda ............................. 177/25 X
4,508,185  4/1985  Minamida et al. ...................... 177/1

Primary Examiner—George H. Miller, Jr.
Attorney, Agent, or Firm—Staas & Halsey

[57] ABSTRACT

A combinatorial weighing system which, using a combinatorial weighing apparatus for combining weight data obtained from a plurality of weighing machines to find a combination giving a total combined weight value equal or closest to a target weight value, is capable of performing combinatorial weighing in a case where the target weight value is greater than the maximum load of the weighing apparatus. When such is the case, the system operates by first discharging articles from all of the weighing machines, and then computing the difference between the target weight value and the total weight of the articles discharged from all of the weighing machines in the preceding step.

8 Claims, 3 Drawing Figures

COMBINATORIAL WEIGHING METHOD AND APPARATUS

BACKGROUND OF THE INVENTION

This invention relates to a combinatorial weighing system, particularly a combinatorial weighing method and apparatus for a case where weighing is executed to obtain a target weight value greater than the maximum load of the apparatus, wherein the target value can be weighed out through only a small number of weighing operations.

A combinatorial weighing apparatus has a plurality of weighing machines each consisting of a weighing hopper and a weight sensor associated with the weighing hopper. According to a known combinatorial weighing method using the aforesaid apparatus, combinatorial weighing is carried out by weighing articles which have been introduced into the weighing hoppers of the weighing machines, selecting the combination of weighing machines (referred to as the "optimum" combination) that gives a total weight value equal to a target weight value or closest to the target weight value within preset allowable limits, discharging only those articles contained by the weighing hoppers of the selected weighing machines, and subsequently replenishing the emptied weighing hoppers with new articles to prepare for the next weighing cycle. The foregoing sequence of steps is repeated to automatically carry out a continuous, highly accurate weighing operation.

In a combinatorial weighing apparatus which employs the foregoing combinatorial weighing method, it is sometimes necessary to weigh out articles in excess of the maximum load of the weighing apparatus. To accomplish this, it is common practice to either (A) divide a target weight value $X_a$ into a number of weight values X1, X2, X3 ... each of which is less than the maximum load, and then simply repeat the combinatorial weighing operation a plurality of times, or (B) divide the target weight into a number of weight values each of which is less than the maximum load of the apparatus and then, in conducting weighing from the second weighing operation onward, correcting the target weights X2, X3, ... by any error in the results of the preceding weighing operation.

Weighing method (B) outlined above will now be described in greater detail with reference to the flowchart of FIG. 1. We will assume that the target weight value $X_a$ is 3X grams, and that X1=X, X2=X, X3=X. In order to weigh out 3X grams of the articles, method (B) proceeds in the following fashion:

(1) First, all of the weighing machines are supplied with articles to be weighed.

(2) The weights of the articles fed into the hoppers of the weighing machines are measured (first weight measurement).

(3) Combinations are computed with X1 (=X) grams serving as the target, and the difference between X and Y1, which is the total weight value of the articles contained by those weighing machines that give the optimum combination, is stored in memory as an error E1 (=Y1−X).

(4) The articles are discharged from the weighing machines that give the optimum combination (first discharge operation).

(5) The emptied weighing hoppers of the weighing machines, that is, those that have discharged their articles, are supplied with articles afresh.

(6) The weights of the articles fed into each of the weighing hoppers of the weighing machines are measured (second weight measurement).

(7) Combinations are computed with X2−E1 (=X−E1) grams serving as the target, and the difference between the target value (X−E1) and Y2, which is the total weight value of the articles contained by those weighing machines that give the optimum combination, is stored in memory as an error E2 (=Y1−X). It should be noted that:

$$E = Y2 - (X - E1)$$
$$= Y1 + Y2 - 2X$$

(8) The articles are discharged from the weighing machines that give the optimum combination (second discharge operation).

(9) The weighing hoppers of the weighing machines that have discharged their articles are supplied with articles afresh.

(10) The weights of the articles fed into each of the weighing hoppers of the weighing machines are measured (third weight measurement).

(11) Combinations are computed with X3−E2 (=X−E2) grams serving as the target, and the articles are discharged from the weighing machines that give the optimum combination (third discharge operation). The end result is 3X grams of the articles.

A disadvantage encountered with the above-described target weight dividing method, when weighing out articles to a weight greater than the maximum load, is that combinatorial computations must be performed a considerable number of times to obtain a target weight above the maximum load. Therefore, the method is not suitable for weighing at high speed. Another problem with the foregoing combinatorial weighing method is that there are instances where some weighing machines remain unselected for a prolonged period of time so that the weighing hoppers thereof retain their articles for too long. The reason for prolonged retention of articles in a weighing hopper is that the article batch has a peculiar weight which does not lend itself to selection. If article batches having peculiar weights grow in number because they are unfit for selection, a situation will eventually arise in which no desirable combinations can be obtained. Furthermore, articles such as frozen foods will thaw or spoil if retained in the weighing hoppers for an extended period of time. It is obvious, therefore, that prolonged retention of articles in unselected weighing hoppers is undesirable and should be avoided.

SUMMARY OF THE INVENTION

An object of the present invention is to provide a combinatorial weighing method and apparatus wherein a target weight of articles can be weighed out by a small number of weighing operations, even if the target weight is greater than the maximum load of the apparatus.

Another object of the present invention is to provide a combinatorial weighing method and apparatus wherein articles will not reside in weighing hoppers for a prolonged period of time, and wherein a decline in accuracy and spoiling of articles caused by article batches of peculiar weights can be prevented.

According to the the present invention, the foregoing objects are attained by providing a combinatorial weighing method and apparatus for combining weight data obtained from a plurality of weighing machines to find a combination giving a total combined weight value equal or closest to a target weight value. The combinatorial weighing is capable of being performed in a case where the target weight value is greater than the maximum load of the weighing apparatus. At such time, the system operates by first discharging articles from all of the weighing machines, and then computing the difference between the target weight value and the total weight of the articles discharged from all of the weighing machines in the preceding step.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
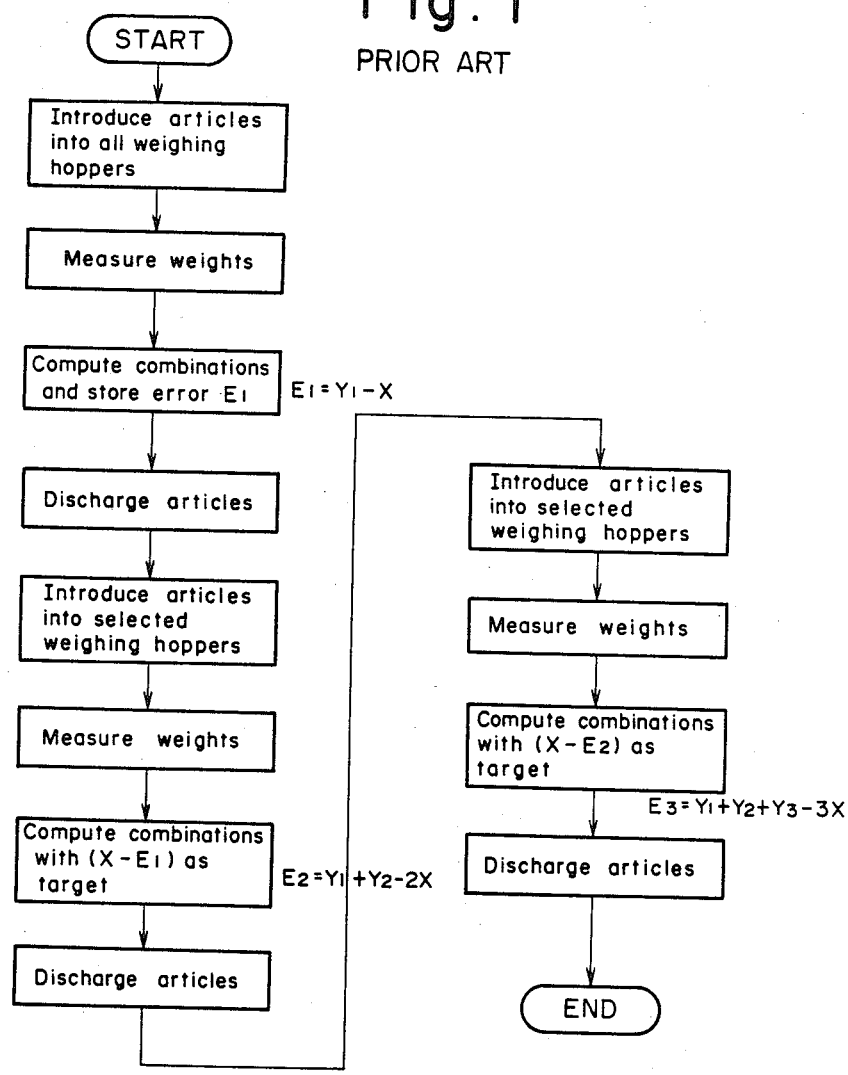
FIG. 1 is a flowchart of a combinatorial weighing method according to the prior art.

Before turning to the drawings for a detailed description of the invention, the essentials of the invention will be discussed briefly below.

Let us examine a case where articles having a combined weight of X grams are to be weighed out in a combinatorial weighing apparatus having N-number of weighing machines. The target weight value will therefore be X grams. To obtain the target weight, the amount of articles fed to each weighing machine should be adjusted to have an average value of 2X/N grams when N is even, and 2X/(N+1) grams when N is odd. The reason is as follows. The number of combinations that can be computed by a combinatorial weighing apparatus composed of N weighing machines, where a combination may be made up of only one weighing machine or up to all N of the weighing machines, is $2^N - 1$. When N is even, combinations composed of N/2 weighing, machines will be the largest in number among the $2^N - 1$ combinations. When N is odd, combinations composed of (N+1)/2 or of (N−1)/2 weighing machines will be the largest in number among the $2^N - 1$ combinations. For example, when N=10, only ten combinations made up of one weighing machine each will exist, whereas the number of combinations composed of five (i.e., N/2) weighing machines will be 252. Accordingly, the weight of the articles fed into each weighing machine of the apparatus should be in the neighborhood of 1/(N/2) of the target value X, i.e., 2X/N. In a case where the weight values of the individual article batches are controlled in this manner, there is a very high probability that the sought combination (i.e., the "optimum" combination) will exist in the combinations composed of N/2 or (N/2)±0.5 weighing machines, thereby enabling an extremely accurate weighing operation. According to the present invention, therefore, each of the weighing machines is supplied with a batch of articles having a weight of approximately 2X/N (where N is even) or 2X/(N±1) (where N is odd), X being the target weight.

When the target weight, e.g., 3X, is greater than the maximum load of the weighing apparatus, the method of the present invention provides the desired target weight through the following steps: a first step of discharging the articles from all weighing machines and computing the total weight W1 of the discharged articles, and a second step of discharging solely those articles in the weighing machines, resupplied with articles, selected by computing combinations with (3X−W1) serving as the target weight. The total amount of articles discharged by the first and second steps. will provide the target weight of 3X. Thus, whereas the conventional method requires a third step, namely another combination computing step, the present invention calls for only one combination computing step and one total discharge step, for a total of two steps. This enables weighing to proceed at a high speed without inviting any decline in weighing accuracy.

The foregoing is for a particular case, namely where 3X is the target weight. In general, where the target value is (2m+1)X (in which m is an integer greater than or equal to 1 ), a so-called total charge - total discharge cycle is repeated m times. This cycle entails supplying all weighing machines with articles, with 2X/N serving as the target per weighing machine each time (where N is even), and disharging the articles from all weighing machines, followed by performing a combinatorial computation with $$\left[ (2m + 1) \cdot X - \sum_{i=1}^{m} Wi \right]$$

serving as the target, where Wi is the total weight of all discharged articles up to and including the i-th total discharge.

Thus, the foregoing deals with a case where the target value is (2m+1)X (where m is an integer greater than or equal to 1) in a weighing apparatus which supplies each of the weighing hoppers with articles at a target weight of 2X/N (where N is even) or 2X/(N±1) (where N is odd,) when the target value is X. In other words, in the foregoing, the weight of the article batch supplied to each weighing machine is fixed at 2X/N or 2X/(N±1). However, a weighing method is possible wherein the amount of articles introduced is variable rather than fixed.

More specifically, let us investigate a case where the target value is Ya, which is greater than the maximum load of the weighing apparatus, with the abovementioned total charge - total discharge cycle being performed m times. In this case, the quantity of articles charged into each of the weighing hoppers will be controlled in such a manner that the average weight W of each batch will be given by the following:

$$W = \frac{Ya}{(2m + 1)} \cdot \frac{2}{N} \tag{1}$$

where N is even, or $$W = \frac{Ya}{(2m + 1)} \cdot \frac{2}{(N \pm 1)} \tag{2}$$

where N is odd. Thus, after m total discharge cycles, the discharged articles will have an approximate weight given by:

$$m \cdot N \cdot W = \frac{2m \cdot Ya}{(2m + 1)}$$

Therefore, the weight which remains to be discharged to obtain the target weight is given by the following equations as approximately:

$$Ya - \frac{2mYa}{(2m + 1)} = \frac{Ya}{(2m + 1)}$$

Accordingly, control is effected so that articles will be charged into each of the weighing machines with the weight indicated by Eq. (1) or Eq. (2) serving as the target when N is even or odd, respectively. Thus, by m total discharge cycles (i.e., by discharging articles from all weighing hoppers m times) and one combinatorial computation, a combination of articles having a weight greater than the maximum load of the weighing apparatus can be obtained with great accuracy. For $Ya=3X$ and $m=1$, W will be $2X/N$ or $2X/(N\pm1)$, which is identical to the case where the quantity of articles charged into each weighing machine is fixed.

Figure 2:
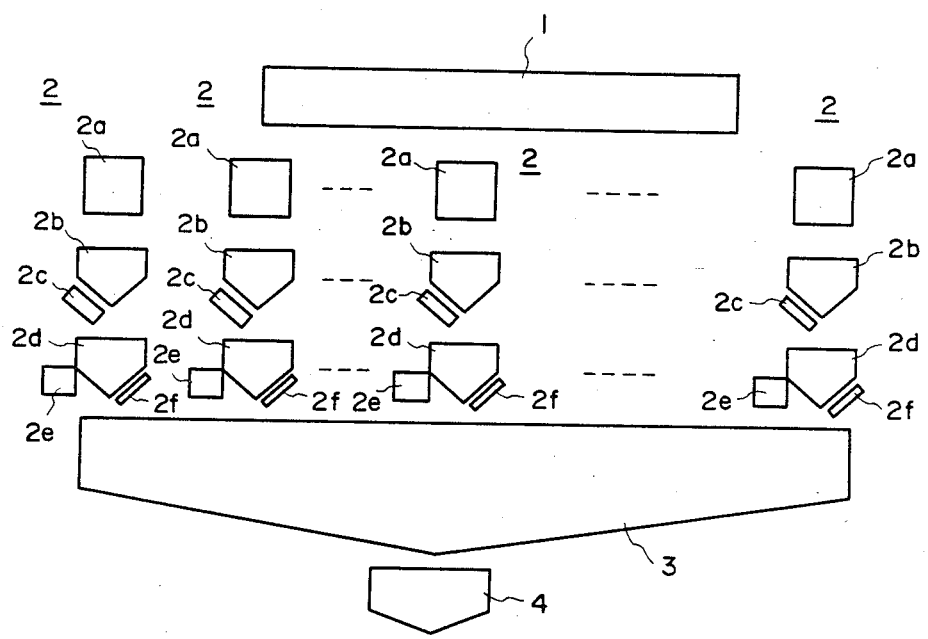
FIG. 2 is a diagrammatic view of the construction of a combinatorial weighing apparatus according to the present invention.
Figure 3:
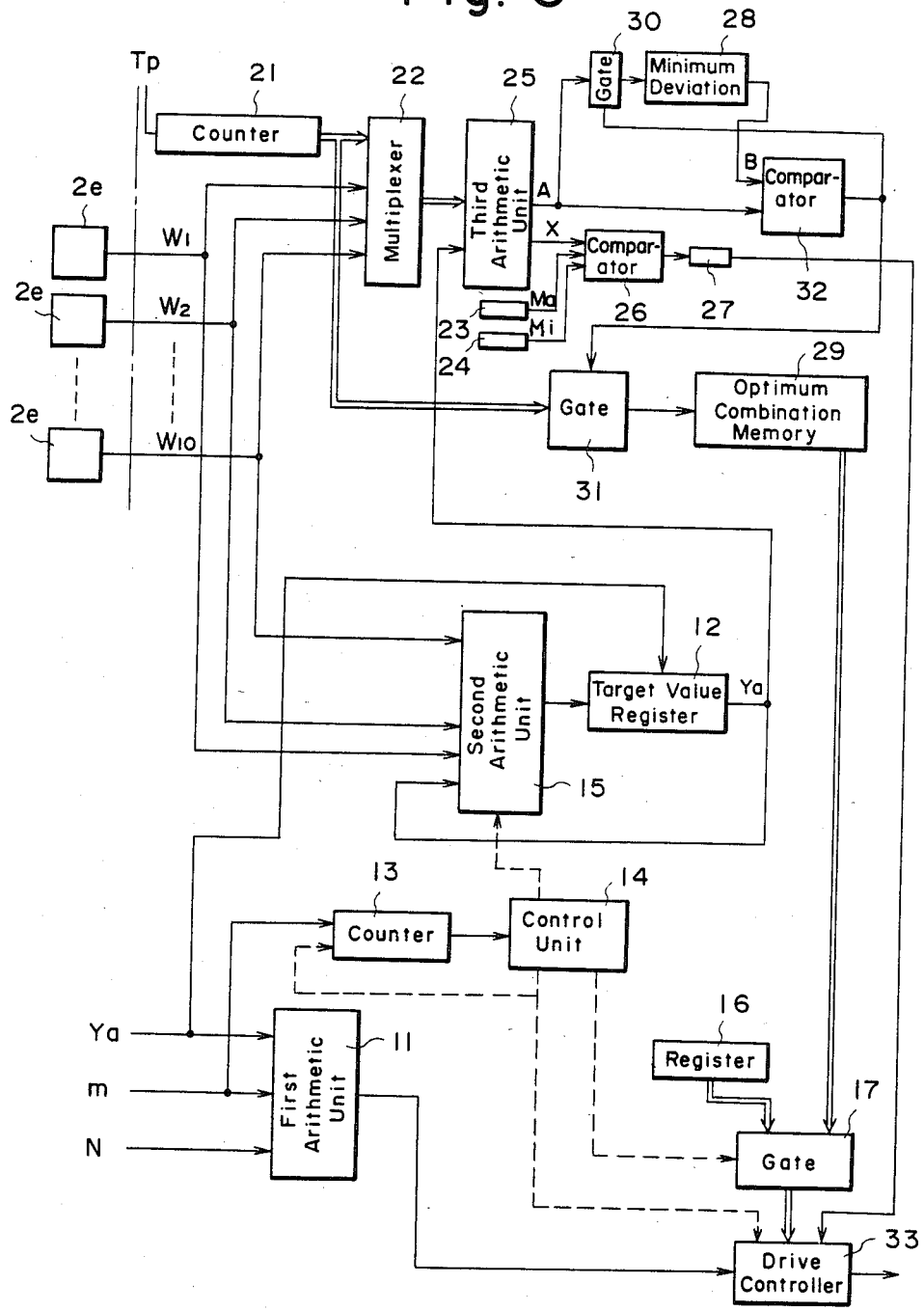
FIG. 3 is a block diagram of a combination control unit included in the combinatorial weighing apparatus of the present invention.

FIGS. 2 and 3 illustrate a combinatorial weighing apparatus for practicing the weighing method of the present invention as described hereinabove. FIG. 2 shows the apparatus in diagrammatic form, and FIG. 3 is a block diagram of a combination control unit.

Referring to FIG. 2, numeral 1 denotes a main feeder of vibratory conveyance type. Articles to be weighed are introduced into the main feeder 1 and imparted with vibratory motion for a predetermined length of time so as to be dispersed radially outward from the center of the main feeder. Numerals 2, 2 . . . denote n-number of equally spaced weighing stations which are arranged around the main feeder 1 along radially extending lines to receive the articles dispersed by the main feeder. Each weighing station 2 includes a dispersing feeder 2a, a pool hopper 2b, a pool hopper gate 2c, a weighing hopper 2d, a weight sensor 2e, and a weighing hopper gate 2f. The dispersing feeder 2a may comprise solely a substantially circular bowl member which has a plurality of gates on its outer circumference, and which is vibrated so that articles will be transferred therealong away from the center of the bowl, or means having a plurality of troughs, provided with feeders, arranged radially about the center of a small circular bowl. In either case, each dispersing feeder 2a is so arranged that articles approximately equivalent in weight to the weight given by Eq. (1) or (2) can be introduced into the corresponding underlying pool hopper 2b. With the dispersing feeder comprising the substantially circular bowl, the quantity of articles supplied to the corresponding weighing hopper 2b is regulated by controlling the gate opening time or opening area. With the dispersing feeder having the troughs and feeders, the supply of articles to the weighing hopper is regulated by controlling feeder vibration time and vibration amplitude. The pool hopper gate 2c is provided on each pool hopper 2b in such a manner that the articles received in the pool hopper 2b are released into the weighing hopper 2d when the pool hopper gate 2c is opened. Each weighing hopper 2d is provided with a weight sensor 2e of its own. The weight sensor 2e is operable to measure the weight of the articles introduced into the corresponding weighing hopper, and to apply an electrical signal indicative of the measured weight to the combination control unit shown in FIG. 3. The combination control unit then selects the combination of articles (the "optimum" combination) which gives a total weight closest to the target weight value, as will be described below in further detail. Each weighing hopper 2d is provided with its own weighing hopper gate 2f. A drive control unit, shown in FIG. 3, upon receiving the signals from each of the weight sensors, produces a signal to open only the weighing hopper gates 2f of those weighing hoppers 2d that give the optimum combination, these gates 2f discharging the articles from the corresponding weighing hoppers 2d into a common chute 3 where they are collected together. The collecting chute 3 has the shape of a funnel and is arranged so as to receive the articles from any of the circularly arrayed weighing hoppers 2d via the hopper gates 2f, which are located above the funnel substantially along its outer rim. The articles received by the collecting chute 3 are collected at the centrally located lower end thereof by falling under their own weight or by being forcibly shifted along the inclined wall of the funnel by a mechanical scraper or the like, which is not shown. The collecting chute 3 is provided with a timing hopper 4 at the lower end thereof for temporarily holding the collected articles. The arrival of an externally applied release signal from a packaging machine or the like causes the timing hopper 4 to release the retained articles from the system.

Reference will now be had to the block diagram of FIG. 3 for a description of the combination control unit. Numeral 11 denotes a first arithmetic unit, having inputs of a Ya, N and m, indicative of a target value, total number of weighing machines, and the number of times total discharge (i.e., discharge of articles from all weighing machines, as mentioned above) is to take place, respectively, for executing an arithmetic operation in accordance with Eq. (1) or Eq. (2), depending upon whether N is even or odd, respectively. The result of the computation is applied as an input to a drive controller 33. The signal indicative of the target value Ya also enters a target value register 12, where the value is stored as a result. The signal indicative of the number m of total discharge cycles is applied to a counter 13, where m is preset. A control unit 14 monitors the state of the counter 13, producing various control signals for total discharge of articles when the state of the counter is found to be non-zero. A second arithmetic unit 15 responds to a computation start signal from the control unit 14 by computing the difference between, and producing an output signal indicative of, the contents Ya of the target value register 12 and the total weight Wt ($=W1+W2+W3+ \ldots +Wn$) sensed by all of the weight sensors 2e, 2e . . . 2e. In other words, the second arithmetic unit 15 performs the operation given by:

$$Ya - Wt \rightarrow Ya \qquad (3)$$

A register 16 stores an all "1" bit pattern. Numeral 17 denotes a gate for delivering the contents (all "1"s) of the register 16 to the drive controller 33 in response to a selection command from the control unit 14, and for delivering the contents of an optimum combination memory 29, described below, to the drive controller when the state of counter 13 is zero. The drive controller 33, in accordance with the bit pattern delivered by the gate 17, is operable to open weighing hopper gates of designated weighing hoppers for a prescribed period of time to discharge the articles from these weighing hoppers. The drive controller 1 then operates to close these weighing hopper gates and open the pool hopper gates of corresponding pool hoppers for a prescribed period of time to supply the aforementioned weighing hoppers with articles from these pool hoppers. The drive controller then closes these pool hopper gates and controls the feeder vibrating time of the dispersing feeder (assumed here to be of the trough-and-feeder type) in accordance with the results of computation performed by the first arithmetic unit 11, whereby the pool hoppers are resupplied with new articles. Numeral 21 is an n-bit (n=10) counter 21 for counting timing pulses TP of a predetermined frequency, and for generating all combinations of n-number of the weighing hoppers. These combinations will also be referred to as "combination patterns" where appropriate. Specifically, for n-number of weighing hoppers, n combinations are possible when each combination is composed of one weighing hopper from the total of n weighing hoppers, $n(n-1)/2!$ combinations are possible when each combination is composed of two weighing hoppers selected from said total, and, in general, $n(n-1)(n-2) \ldots (n-r+1)/r!$ combinations are possible when each combination is composed of r-number of weighing hoppers selected from said total of n weighing hoppers. Accordingly, when the n-bit binary counter 21 has counted $2^n-1$ timing pulses TP, a total of $2^n-1$ different bit patterns, from $000 \ldots 001$ to $111 \ldots 111$, will have been generated. Therefore, if correspondence is established between the first bit and the first weighing hopper, between the second bit and the second weighing hopper, and between third through n-th bits and the third through n-th weighing hoppers, then the generated bit pattern will be an indication of the abovementioned combination pattern.

A multiplexer 22, in accordance with the output bit pattern of the counter 21, provides a third arithmetic unit 25 with weight values (indicative of the weight of the article batches) from the weight sensors 2e of weighing hoppers designated by the bit pattern of the counted value in counter 21. For instance, if the value of the count (the bit pattern) in counter 21 is 1000101011 when n=10, then the third arithmetic unit 25 will receive, as inputs thereto, the weight value outputs W1, W2, W4, W6, W10 from the weight sensors 2e attached to the first, second, fourth, sixth and tenth weighing machines, respectively. Numerals 23 and 24 denote upper and lower limit setting devices, respectively, for storing preset allowable limits (namely an upper limit or maximum value Ma, and a lower limit or minimum value Mi, respectively) which are desirable for weight values. The minimum value Mi is set equal to the target value, as is customary. If it were set lower than the target value, the result could be delivery of articles having a total weight less than that intended, and complaints might ensue.

The arithmetic unit 25 computes, and delivers a signal indicative of, the total weight $\Sigma Wi$ (=X) of the weight values received from the multiplexer and also computes the difference between the total weight $\Sigma Wi$ and the set value Ya. The arithmetic unit 25 produces a signal A indicating the absolute value of the computed difference. More specifically, the arithmetic unit 25 performs the operations:

$$\Sigma Wi = X \quad (4)$$

$$|\Sigma Wi - Ya| = A \quad (5)$$

and produces a signal representing the total weight $\Sigma Wi$ (=X), as well as a signal A representing the absolute value (hereafter referred to simply as the "deviation") of the difference between the total weight $\Sigma Wi$ and the set target weight Wa. The value X is applied to a comparator 26, whose output is connected to a counter 27. The comparator 26 discriminates whether the total weight value X lies in the range defined by Mi and Ma. Specifically, if the following relation holds:

$$Mi \leq X \leq Ma \quad (6)$$

then the comparator 26 will increment (count up) the counter 27 by one. A minimum deviation register 28 for storing the minimum deviation is automatically set to the deviation A the first time only, and thereafter is updated as the conditions warrant, as will be described later. In the case where the minimum value Mi is set equal to the target weight value, it is permissible to initially set the minimum deviation register 28 to the difference between the maximum value Ma and the target value. The optimum combination memory 29 mentioned earlier is adapted to store the optimum combination pattern. Numeral 30 and 31 denote gates. When the total weight value $\Sigma W_i$ is within the preset allowable limits, a comparator 32 compares the deviation value A, namely the output of the arithmetic unit 25, with the minimum deviation value, denoted by B, stored in the minimum deviation register 28. When the inequality A<B holds, the output of comparator 32 is such that the deviation value A is stored in the minimum deviation register 28 through the gate 30, and the content (combination pattern) of counter 21 is stored in the optimum combination memory 29.

When the state of counter 27 is one or more, the discharge control unit 33, which receives a signal from memory 29 indicative of the optimum combination pattern, opens the weighing hopper gates 2f (FIG. 2) specified by the optimum combination pattern, so that the corresponding weighing hoppers discharge their articles into the collecting chute 3. In addition, the discharge control unit 33 also opens the corresponding pool hopper gates 2c so that the emptied weighing hoppers may be replenished with articles.

The operation of the combination control unit will now be described in brief. It will be assumed that the target weight Ya is less than the maximum load of articles in the apparatus, and that the inputs to the first arithmetic unit 11 are the target weight value Ya, the number of total discharge cycles m (m=0 in this case), and the number of weighing hoppers N. The first arithmetic unit 11 will perform the computation of Eq. (1) or (2), and the results of computation will be applied to the drive controller 33. Using the results of the computation, the drive controller 33 causes all of the distributing feeders 2a, 2a, . . . , 2a to supply the corresponding pool hoppers 2b, 2b, . . . , 2b with articles of a weight indicated by Eq. (1) or (2). The drive controller 33 then opens all of the pool hopper gates 2c, 2c, . . . , 2c so that the articles charged into all of the pool hoppers 2b, 2b, . . . , 2b will be delivered to the corresponding weighing hoppers 2d, 2d, . . . 2d, and then, causes all of the distributing feeders 2a, 2a, . . . , 2a to introduce articles into all of the pool hoppers 2b, 2b, . . . The foregoing steps leave all pool hoppers and all weighing hoppers supplied with articles, completing the operation for establishing initial, or starting, conditions.

Next, the weight sensors 2e, 2e, . . . , 2e provided on corresponding ones of the weighing hoppers 2d, 2d, . . . , 2d measure the weights of the articles and produce weight values W1 through W10 which are sent to the multiplexer 22 and the second arithmetic unit 15. The n-bit (n=10) counter 21 counts the timing pulses TP, having the predetermined frequency, to produce $2_n-1$ combination patterns. Thus, when the first timing pulse TP arrives and is counted, the state of counter 21 becomes 0000000001. As a result, the multiplexer 22 sends the first weight value signal W1, from the weight sensor 2e provided on the first weighing hopper, to the third arithmetic circuit 25, which responds by performing the operations specified by equations (4) and (5). Signals indicative of the total weight $\Sigma W_i$ of the combination and of the deviation A $(=|W1-Y_a|)$ between $\Sigma W_i$ and the set target weight value $Y_a$, are then produced. Since the gates 30 and 31 will be open for the initial combinatorial computation, the deviation value A is transferred to and stored in the minimum deviation register 28, and the content (the combination pattern 0000000001) of n-bit counter 21 is stored in the optimum combination memory 29. Comparator 26 compares the total weight $\Sigma W_i(=X)$ against the maximum value Ma and the minimum value Mi, and increments the counter 27 when the relation $M_i \leq X \leq M_a$ holds. Thenceforth, when the second timing pulse TP is generated, the pulse is counted by counter 21, whose state (combination pattern) is incremented to 0000000010. Consequently, the weight value output W2 of the weight sensor 2e provided on the second weighing hopper is delivered to the third arithmetic unit 25 which then performs the operations of equations (4) and (5) to produce the signals indicative of the total weight $\Sigma W_i(=X)$ and of the deviation value A $(A=|W2-Ya|)$. The comparator 26 then determines whether relation (6) is satisfied; if it is, then the state of counter 27 is incremented by one. The comparator 32, meanwhile, compares the deviation value A with the state B $(=|W1-Y_a|)$ of the minimum deviation register 28. If the relation $A \geq B$ holds, then neither the register 28 nor the optimum combination memory 29 is updated; if $A<B$ holds, the deviation value A is transferred to and stored in register 28, and the state of counter 21 is transferred to and stored in the optimum combination memory 29. The operation described above is repeated until all $2^n-1$ combinations have been generated. At such time the content of the minimum deviation register 28 will be the minimum deviation value obtained from the $2^n-1$ combinations, and the content of the optimum combination memory 29 will be the combination pattern that gave the minimum value. The optimum combination is thus selected from the total of $2^n-1$ possible combination patterns. If the value of the count in counter 27 is one or more, the drive controller 33 opens the weighing hopper gates 2f of weighing machines corresponding to the "1" bits of the input combination pattern (namely the optimum combination pattern), whereby the articles in the weighing hoppers constituting the optimum combination are discharged into the collecting chute 3, after which the drive controller 33 opens the corresponding pool hopper gates 2c to replenish the emptied weighing hoppers 2d with articles. Further, the dispersing feeders 2a, corresponding to the emptied pool hoppers, are vibrated for a fixed length of time to resupply the pool hoppers with articles.

This completes one combinatorial weighing cycle, which may be repeated as often as required, to provide batches of the articles, each batch having a total weight equal or closest to the set target weight. It should be noted that when the content of counter 27 is zero in the foregoing operation, articles are not discharged and each of the weighing machines must be supplemented with articles to resume the combinatorial computations.

Described next will be a case where the set value Ya is greater than the maximum load of the weighing apparatus. When this is the case, the number m of total discharge cycles is set on a digital switch provided on a panel, not shown. In the following discussion, the assumption will be m=1. This value will be preset in the preset counter 13 and applied to the first arithmetic unit 11. The latter will then perform the arithmetic operation of Eq. (1) or (2) and deliver the results to the drive controller 33. Thereafter, the operations for establishing the initial conditions are identical to the case where m=0, described above.

At the start of operation, the state of counter 12 will be non-zero (m=1), so that the control unit 14 will deliver a computation start command to the second arithmetic unit 15. The latter responds by performing the operation of Eq. (3), with the results of the computation being applied to the target value register 12. The control unit 14 also applies a selection signal, for selecting the register 16, to the gate 17. As a result, the drive controller 33, in response to a discharge command from the control unit 14, opens all of the weighing hoppers, causing them to discharge their articles, on the basis of the all "1" bit pattern stored in the register 16. Next, the drive controller 33 opens all of the pool hopper gates 2c, 2c, . . . , 2c to supply all of the weighing hoppers 2d, 2d, . . . , 2d with articles. Subsequently, all of the dispersing feeders 2a, 2a, . . . , 2a are vibrated for a period of time based on the results of the arithmetic operation of Eq. (1) or (2), implemented by the first arithmetic unit 11, whereby all of the pool hoppers 2b, 2b, . . . , 2b are supplied with articles. The state of the counter 13 is decremented by the discharge command from the control unit 14, becoming zero.

When the foregoing total discharge cycle is completed, a combinatorial computation is performed with the value (Ya−Wt) stored in the target value register 12 serving as the target, just as described above in the case where the target value was less than the maximum load.

In accordance with the present invention as described and illustrated hereinabove, only a single combinatorial computation need be performed, even when the target weight is greater than the maximum load of the weighing apparatus. This makes it possible to perform weighing at high speed. Further, let Xr represent the weight left to be weighed out after the total discharge cycle(s) to obtain the target weight. According to the invention, articles are charged into each of the weighing hoppers with $2 \cdot Xr/N$ or $2 \cdot Xr/(N\pm 1)$ serving as the target upon completion of the total discharge cycle. This permits weighing to be carried out with great accuracy. In addition, since there will be at least one total discharge cycle, articles are not retained in the weighing hoppers for an extended period of time owing to prolonged non-selection. Therefore, articles such as frozen foods will not spoil.

In the illustrated embodiment, m is set manually. However, an arrangement is possible wherein m can be generated automatically based on a balance between the target weight value and the maximum load of the apparatus.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing method for use in a combinatorial weighing apparatus for combining weight data obtained from a plurality of weighing machines to find a combination giving a total combined weight value equal or closest to a target weight value within a preset weight range and for discharging weighed batches of articles from the weighing machines providing the combination, the combinatorial weighing being performed for a case where the target weight value is greater than the maximum load of the weighing apparatus, said method comprising the steps of:
   (a) computing an average weight value of batches of articles, which are to be charged into each of the weighing machines, based on a number of times m batches of articles, where m is an integer greater than or equal to one, are to be discharged from all of the plurality of weighing machines, the target weight value, and the total number of weighing machines;
   (b) repeating, m times, a cycle of discharging the batches of articles from all of the weighing machines and supplying batches of articles, having substantially the average weight value, into each of the weighing machines;
   (c) computing a difference between the target weight value and the total weight value of the batches of articles obtained after discharging the batches of articles from all of the weighing machines m times;
   (d) selecting a combination of batches of articles, with the difference serving as the target weight value, contained in the weighing machines giving a total weight within the preset weight range inclusive of the target weight value; and
   (e) discharging the selected batches of articles.

2. A combinatorial weighing apparatus for combining weight data obtained from a plurality of weighing machines to find a combination giving a total combined weight value equal or closest to a target weight value within a preset weight range, and for discharging weighed batches of articles from the weighing machines providing the combination, said combinatorial weighing apparatus comprising:
   first arithmetic means for computing an average weight value of batches of articles, which are to be charged into each of the weighing machines, based on a number of times m batches of articles, m being an integer greater than or equal to one, are to be discharged from all of the plurality of weighing machines, the target weight value, and the total number of weighing machines;
   means for repeating, m times, a cycle of discharging batches of articles from all of the weighing machines and supplying batches of articles of substantially the average weight value into each of the weighing machines;
   second arithmetic means, operatively connected to the weighing machines, for computing a difference between the target weight value and the total weight value of the batches of articles obtained after discharging the batches of articles from all of the weighing machines m times; and
   means for selecting a combination of batches of articles, with said difference serving as the target weight value, contained in the weighing machines giving the total weight within the preset weight range inclusive of the target weight value.

3. A combinatorial weighing method of combining weight data corresponding to batches of articles to determine a combination giving a total combined weight value equal or closest to a target weight value within a preset weight range and, for discharging the batches of articles forming the combination from a weighing apparatus including weighing hoppers, the target weight value being greater than the maximum load of the weighing apparatus, said combinatorial weighing method comprising the steps of:
   (a) computing an average weight value for the batches of articles to be supplied m times to each of the hoppers, m being an integer greater than or equal to one;
   (b) discharging the batches of articles from all of the hoppers and supplying batches of articles having substantially the average weight value into the hoppers, m times;
   (c) computing the difference between the target weight value and the total weight value of the batches of articles discharged m times from all of the hoppers;
   (d) selecting a combination of batches of articles having an adjusted target weight value equal to the difference between the target weight value and the total weight value; and
   (e) discharging the selected combination of batches of articles, thereby obtaining the combination giving the total combined weight value equal or closest to the target weight value within the preset weight range.

4. A combinatorial weighing apparatus for combining weight values corresponding to batches of articles stored in a storing means to obtain a combination giving a total combined weight value equal or closest to a target weight value within a preset weight range, said combinatorial weighing apparatus comprising:
   first arithmetic means for computing an average weight value of batches of articles to be charged m times, m being an integer greater than or equal to one, into each of the hoppers from the means for storing weighed batches of articles;
   means for discharging the batches of articles having substantially the average weight value, from all of the hoppers and resupplying batches of articles to the hoppers from said means for storing weighed batches of articles, m times;
   second arithmetic means, operatively connected to the hoppers, for computing a difference between the target weight value and the total weight value of the batches of articles discharged m times from all of the hoppers; and
   means for selecting a combination of batches of articles supplied to the hoppers, said combination having an adjusted target weight value equal to the difference between the target weight value and the total weight value, obtaining the combination giving the total combined weight value equal or closest to the target weight value within the preset weight range.

5. A combinatorial weighing method for introducing articles to be weighed, from a main feeder to a plurality of weighing hoppers, so that batches of articles have a weight approximately equivalent to an average weight, the average weight determined by:

$$W = \frac{Ya}{(2m+1)} \cdot \frac{2}{N} \quad (1)$$

where W is the average weight, Ya is the target value, m is the number of times a total charge - total discharge cycle is performed, and N is the number of weighing hoppers and is an even integer or $$W = \frac{Ya}{(2m+1)} \cdot \frac{2}{(N \pm 1)} \quad (2)$$

where N is an odd integer.

6. A combinatorial weighing means for introducing articles to be weighed, from a main feeder to a plurality of weighing hoppers, so that batches of articles have a weight, approximately equivalent to an average weight, determined by the following equation:

$$W = \frac{Ya}{(2m+1)} \cdot \frac{2}{N} \quad (1)$$

where W is the average weight, where Ya is the target value, m is the number of times a total charge - total discharge cycle is performed, and N is the number of weighing hoppers and is an even integer, or $$W = \frac{Ya}{(2m+1)} \cdot \frac{2}{(N \pm 1)} \quad (2)$$

where N is an odd integer.

7. A combinatorial weighing method as set forth in claim 1, wherein said step (a) comprises computing the average weight value of batches of articles by the following equation:

$$W = \frac{Ya}{(2m+1)} \cdot \frac{2}{N} \quad (1)$$

where W is the average weight, Ya is the target value, m is the number of times a total charge - total discharge cycle is performed, and N is the number of weighing hoppers and is an even integer, or $$W = \frac{Ya}{(2m+1)} \cdot \frac{2}{(N \pm 1)} \quad (2)$$

where N is an odd integer.

8. A combinatorial weighing method as set forth in claim 3, wherein said step (a) comprises computing the average weight value of batches of articles by the following equation:

$$W = \frac{Ya}{(2m+1)} \cdot \frac{2}{N} \quad (1)$$

where W is the average weight, Ya is the target value, m is the number of times a total charge - total discharge cycle is performed, and N is the number of weighing hoppers and is an even integer, or $$W = \frac{Ya}{(2m+1)} \cdot \frac{2}{(N \pm 1)} \quad (2)$$

where N is an odd integer.

* * * * *

UNITED STATES PATENT AND TRADEMARK OFFICE
CERTIFICATE OF CORRECTION

PATENT NO. : 4,552,237
DATED : NOVEMBER 12, 1985
INVENTOR(S) : TAKASHI SASHIKI ET AL.

It is certified that error appears in the above-identified patent and that said Letters Patent is hereby corrected as shown below:

FRONT PAGE, IN THE HEADING, "Saskiki et al." should be --Sashiki et al--;

[75] Inventors, line 1, "Saskiki" should be --Sashiki--.

Col. 3, line 43, "(N+1)" should be --(N$\pm$1)--;
line 50, "weighing," should be --weighing--.

Col. 4, line 14, "steps." should be --steps--.

Col. 5, line 10, "equations" should be --equation--.

Col. 7, line 61, "of," should be --of--;
line 62, "multiplexer" should be --multiplexer,--.

Signed and Sealed this

Twenty-eighth Day of January 1986

[SEAL]

Attest:

DONALD J. QUIGG

Attesting Officer

Commissioner of Patents and Trademarks